(12) United States Patent
Pinho et al.

(10) Patent No.: US 10,253,273 B2
(45) Date of Patent: Apr. 9, 2019

(54) PROCESS TO OBTAIN FUEL FROM BIOMASS IN FLUID CATALYTIC CRACKING

(71) Applicant: PETROLEO BRASILEIRO S.A.-PETROBRAS, Rio de Janeiro (BR)

(72) Inventors: Andrea de Rezende Pinho, Rio de Janeiro (BR); Fabio Leal Mendes, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 15/441,668

(22) Filed: Feb. 24, 2017

(65) Prior Publication Data
US 2017/0240824 A1     Aug. 24, 2017

(30) Foreign Application Priority Data
Feb. 24, 2016   (BR) .................... 10 2016 003995-9

(51) Int. Cl.
  *C10G 69/04* (2006.01)
  *C10G 51/02* (2006.01)

(52) U.S. Cl.
  CPC ........... *C10G 69/04* (2013.01); *C10G 51/026* (2013.01); *C10G 2300/1014* (2013.01); *C10G 2300/202* (2013.01); *C10G 2400/02* (2013.01); *Y02P 30/20* (2015.11)

(58) Field of Classification Search
  CPC ...... C10G 2300/1014; C10G 2300/202; C10G 2400/02; C10G 51/026; C10G 69/04
  See application file for complete search history.

(56) References Cited

FOREIGN PATENT DOCUMENTS

BR    10 2012 013787-9    6/2012

*Primary Examiner* — Sharon Pregler
(74) *Attorney, Agent, or Firm* — Sughrue Mion, PLLC

(57) ABSTRACT

The present invention relates to a process for obtaining fuel from biomass which comprises the introduction of the catalyst (3) in the base of an cracking section (4), wherein said catalyst (3) at high temperature comes in contact with a gas stream of light hydrocarbons rich in hydrogen (1), wherein the catalyst (3) and hydrocarbon (1) then come in contact with a lignocellulosic liquid stream (2) in the same cracking section (4), creating the reaction mixture (5) that, soon after, comes into contact with the main stream containing the traditional fossil load of a FCC (6) in a second cracking section (7).

17 Claims, 1 Drawing Sheet

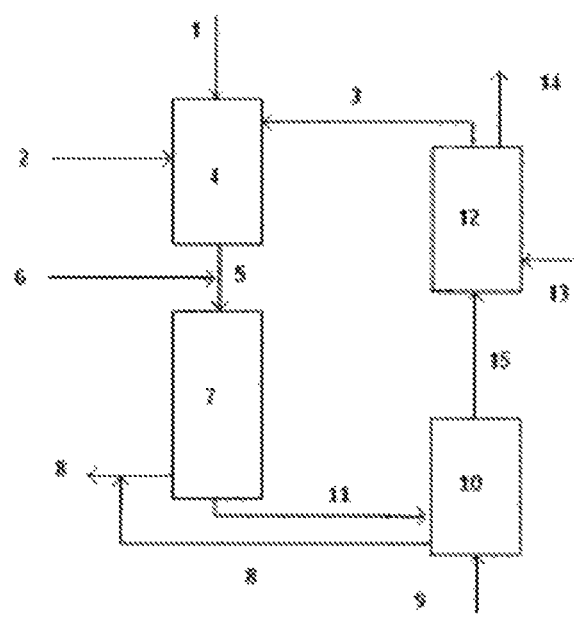

PROCESS TO OBTAIN FUEL FROM BIOMASS IN FLUID CATALYTIC CRACKING

FIELD OF THE INVENTION

The process of the present invention can be applied in the generation of fuels, specifically in the production of high-octane gasoline and diesel engines, fuels that are referred to as green fuels from a lignocellulosic source through fluid catalytic cracking (FCC).

BASES OF THE INVENTION

The use of biomass to replace fossil hydrocarbons in fuel production has been growing rapidly in recent years, driven by a demand from society for environmentally friendly products.

A natural replacement for fossil hydrocarbons oil is biomass, a renewable carbon source. In general, any material of plant origin that has bioenergy and can be processed to provide more elaborate and bioenergetic forms suitable for the end use is called biomass. In the context of bioenergy, the production of liquid biofuels from biomass is considered to particularly cater to vehicular transportation needs.

The trend of studies in this area is to develop biotechnological processes that allow the use of residual biomass of lignocellulosic composition and waste from the pulp industry, abundantly generated in the agricultural and forestry sectors, for the production of biofuels.

Lignocellulosic materials are formed by hard and fibrous structures, composed mostly of polysaccharides cellulose and hemicellulose, intermingled with other macromolecule formed by aromatic lignin alcohols, which are joined by covalent and hydrogen bonds. In smaller proportions, depending on the vegetable source, there can also be resins, fatty acids, phenols, tannins, nitrogen compounds and mineral salts, mainly calcium, potassium and magnesium.

Cellulose (23-50% of dry matter of the lignocellulosic biomass) is a linear polymer containing up to 15,000 units of $\beta$-D-glucoses units joined by glycosidic $\beta$-1.4 carbon-carbon bonds and intramolecular and intermolecular hydrogen.

The cellulose, in order to be transformed into chemical inputs, is converted into glucose through a hydrolysis process. The glucose may be fermented to obtain ethanol or butanol, isopropanol, 2,3-butadiene, glycerol, acetone, acetic acid and butyric acid.

Hydrolysis of glucose with dilute acids also leads to hydroxymethylfurfural, which can be cleaved in levulinic acid and formic acid, levulinic acid being an interesting input for polyesters.

In turn, the hemicellulose fraction (15 to 45% of the dry lignocellulosic material) consists of branched sugar chains the units of which mainly include aldopentoses such as arabinose and xylose, and aldohexoses such as glucose, mannose and galactose. This macromolecule further contains hexuronic acids, such as f3-D-glucuronic acid, D-.beta.-4-0-methylglucuronic and galacturanic.

The hemicellulose can be converted into sugars which can be fermented to obtain alcohols by a hydrolysis process under mild conditions. The hemicellulose can also be processed to obtain furfural as a main product and for generating resins.

Since the biochemical structure of the lignin fraction (10 to 30% dry matter of the lignocellulosic biomass) has a three-dimensional shape and is formed by p-propifenol units with methoxyl substituents in the aromatic ring, joined by ether bonds and establish cross bonds between each other.

The lignins can be transformed into oils with characteristics similar to those of petroleum for a hydrogenolysis process.

The lignins can also be advantageously used in the production of phenol-formaldehyde resins or to provide synthesis gas by gasification with oxygen.

Thus, the issue presented shows the need for new processes for biomass processing to generate environmentally friendly fuels, especially due to environmental problems, particularly when it comes to greenhouse gas emissions.

In this scenario, document BR102012013787-9 reveals a process for obtaining high-octane gasoline from liquid vegetable biomass by coprocessing renewable streams in fluid catalytic cracking (FCC) separately introducing the liquid biomass (bio-oil) and a fossil load in two distinct reaction zones. The advisable region for injection of a biomass liquid is below the injection of the main load of fossil hydrocarbons. While there is a substantial improvement in the bio-oil coprocessing gains profile, said document does not alleviate the deficiency in hydrogen of this renewable load, which contains only 6 to 8% hydrogen by weight, much lower than that found for the fossil load traditionally used in FCC (greater than 12% by weight).

Therefore an objective of the present invention is to propose a process for obtaining biofuels, particularly high-octane gasoline and biodiesel by coprocessing a load including liquid vegetable biomass from a lignocellulosic source, a gaseous stream of light, saturated hydrocarbons rich in hydrogen, and a main fossil load, wherein the gas stream containing saturated hydrocarbons aims to alleviate the deficiency in the renewable hydrogen load, thus improving the performance profile of the coprocessing of liquid lignocellulosic biomass compared to the main fossil load without costly changes being required in the FCC system.

As will be better detailed below, the present invention seeks to resolve the prior art problems described above in a practical and efficient manner.

SUMMARY OF THE INVENTION

The present invention provides a process of obtaining lignocellulosic fuels, more specifically production of high-octane gasoline and diesel fuel.

The process involves coprocessing a load including liquid biomass of a lignocellulosic source, a gaseous stream of saturated light hydrocarbons and a main fossil load, in the FCC process.

The hydrocarbon stream generated by the process of the present invention has high octane. Furthermore, there is an improvement in the yield profile by the transfer of the gaseous hydrogen load containing saturated light hydrocarbons for the renewable load deficient in hydrogen.

The invention further benefits from reducing the rate of formation coke on the catalyst, caused by a decrease in the concentration of precursors by dilution with gas.

BRIEF DESCRIPTION OF THE FIGURES

The detailed description below makes reference to the accompanying FIG. 1, which illustrates, in simplified terms, the process for obtaining lignocellulosic fuels in a FCC riser type reactor according to the present invention.

DETAILED DESCRIPTION OF THE INVENTION

The present invention is characterized by a process for the production of fuel, particularly high-octane gasoline with RON ("Research Octane Number") above 90 and/or MON ("Motor Octane Number") above 75.

In the process of obtaining the lignocellulosic fuel under the present invention, a gaseous stream of light hydrocarbons rich in hydrogen (1) is added to the base of a riser-type catalytic cracking reactor (4) which further receives a lignocellulosic liquid stream (2) and regenerated catalyst (3), at elevated temperature, constituting a first reaction section (4). The reaction medium thus generated (5) comes into contact with the main fossil load of the FCC (6) generating a second reaction section (7). The reaction products (8) are then removed from the reactor and the catalyst (11) is sent to a rectification section (10) with steam (9) or other inert gas to remove hydrocarbons still present between the catalyst particles. The catalyst coated with coke generated in the reaction section (4) and (7), also called spent catalyst (15) is sent to the regeneration section (12) for combustion of the coke with air (13), generating combustion products (14).

More specifically, in the process of the present invention, the catalyst (3) is introduced at the base of the cracking section (4), wherein said catalyst (3), at elevated temperature, is in contact with a gas stream of light hydrocarbons rich in hydrogen (1) at a temperature between 500° C. to 800° C. and atmospheric pressure to about 400 kPa, wherein the catalyst (3) and hydrocarbon (1) streams then come into contact with a lignocellulosic liquid stream (2) in the same cracking section (4) causing the reaction mixture (5) which then comes in contact with the main stream containing the traditional fossil load of FCC (6) at a second cracking section (7).

In the first reaction section (4) there is the depolymerization of lignin by the zeolitic catalyst (3) under high temperature, preferably in the range between 500° C. to 700° C. and low pressures, preferably in the range of 200 kPa at 400 kPa, catalyst ratio/biomass in the range of 10 to 40 and contact time in the range between 0.1 and 0.9 seconds. This reaction section (4) is where the compound rich in hydrogen is added. The function of the gaseous stream containing hydrocarbons rich in hydrogen (1) added to the catalyst lift of the FCC riser reactor is to mitigate the deficiency in hydrogen of lignocellulosic liquid stream (2), desirable for the optimization of the yield of liquid streams (8) by adding hydrogen thereto.

In the second reaction section (7) there is catalytic cracking of hydrocarbons at a space velocity in the range between 200 $h^{-1}$ and 400 $h^{-1}$, contact time in the range between 1.5 and 3.0 seconds in a temperature range between 500° C. and 620° C. and catalyst/hydrocarbon ratio in the range between 5 and 20. In this section there are also donation/hydrogen transfer reactions of fossil load for the renewable load. This combination leads to the production of high octane gasoline with RON above 90 and MON above 75.

Examples of lignocellulosic liquid streams (2) which can be used in the process are those from agriculture and pulp and paper industry waste, in particular materials obtained by Kraft route, and lignocellulosic materials obtained by processing in fast pyrolysis units, more specifically bio-oil, a material which is rich in sugars and lignin.

In the process, the lignocellulosic liquid stream (2) corresponds to 0.1 to 10% by weight, preferably 2% by weight relative to the amount of total load added to the FCC.

Meanwhile the fossil hydrocarbon stream employed as load (6) can be selected from the chains of petroleum refining. However, such stream should preferably be rich in hydrogen, and the hydrogen content of at least 10% by weight of the compound.

As the gas stream of light hydrocarbons rich in hydrogen (1) can be used as propane, butane, ethane or any stream from natural gas or internal oil streams generated inside the petroleum refinery as rich in pentanes and hexanes present in light naphthas. This light hydrocarbon stream (1) corresponds to 0.1 to 10% by weight, preferably 5% by weight relative to the amount of total load added to the FCC.

The catalysts (3) which can be used in the catalytic cracking process of the present invention are catalysts typical for catalytic cracking reactions, that is, solid catalysts with acid characteristics. Among the catalysts most often used, we can mention those whose main component is zeolite, a crystalline aluminosilicate, also called zeolite catalysts.

Loads consisting of biomass, such as those defined in the present invention, when subjected to the FCC, using solid acid catalysts such as zeolites containing faujasites, lead to depolymerization of the lignin present in such load, generating a product stream rich in aromatic and phenolic compounds in the naphtha range (8).

Ideally, the product stream (8), rich in aromatics and phenolic compounds will subsequently be subjected to a hydrotreating step, which is the setting and adjustment of its properties by removing oxygen compounds, leading to the production of a high octane fuel with a high content of monoaromatic substituted compounds.

In the hydrotreating step of the aromatic-rich stream (8), a temperature between 350° C. and 390° C. is employed, using metal oxides, fully or partially converted to sulfides (active phase) and supported on y-alumina (y-$Al_2O_3$) as a catalyst.

Therefore, after the cracking and hydrotreating steps a high octane fuel is produced, due to the presence of aromatic compounds with a boiling point between 90° C. and 220° C.

Below some results obtained in tests performed in a FCC unit are presented in the examples.

EXAMPLE 1

Propane, a hydrogen donor compound was injected into a catalytic reactor with a flow rate of 0.5 L/min in order to generate a reference for comparison purposes. The reaction temperature was maintained at 540° C. The results shown in Table 1 (Test A) are typical of propane processing at moderate reaction temperatures, around 540° C.

Accordingly, there was no conversion of propane into other compounds.

EXAMPLE 2

Acetone (propanone), a hydrogen acceptor compound representing the renewable load of a lignocellulosic base, was injected into the base of a catalytic reactor at a flow of 200 g/h with the intention of generating a second reference for comparison purposes. The reaction temperature was maintained at 540° C. The results are shown in Table 1 (Test B). Large quantities of water, carbon monoxide and carbon dioxide were generated. The coke yield is relatively high.

EXAMPLE 3

Propane was introduced in a catalytic reactor with a flow rate of 0.5 L/min, with an injection of acetone at a flow rate of 200 g/h as stated by the present invention. The reaction temperature was maintained at 540° C. The results are shown in Table 1 (Test C).

TABLE 1

General conditions and results of tests performed in a FCC unit.

| Tests | A | B | C |
|---|---|---|---|
| General conditions | | | |
| Propane flow rate, L/min | 0.5 | 0 | 0.5 |
| Acetone flow rate, g/h | 0 | 200 | 200 |
| Temperature of the reactor, ° C. | 540 | 540 | 540 |
| Pressure of the reactor, kPa | 260 | 260 | 260 |
| Process results | | | |
| Gaseous hydrocarbons <C4, % m/m | 99.9 | 50.5 | 51.5 |
| Liquid hydrocarbons + C5, % m/m | 0.1 | 0.2 | 0.6 |
| Coke, % m/m | 0.0 | 3.5 | 0.5 |
| Carbon monoxide, % m/m | 0.0 | 1.2 | 1.0 |
| Carbon dioxide, % m/m | 0.0 | 0.6 | 0.5 |
| Water, % m/m | 0.0 | 44.0 | 45.9 |

In comparison to example 2, in example 3, much lower yields of coke and larger yields of gaseous hydrocarbons are obtained, indicating the effectiveness of the invention.

EXAMPLE 4

A bio-oil stream, receiving hydrogen, was injected in a catalytic reactor with a flow rate of only 60 kg/h flow due to the difficulties caused by processing pure bio-oil in catalytic cracking units. The characteristics of a bio-oil stream (re-newable) can be found in Table 2. The catalyst used in testing was an FCC commercial equilibrium catalyst containing ZSM-5.

The results shown in Table 3 were obtained from processing this stream. There is great production of water and carbon monoxide and carbon dioxide quantities are high. The coke yield is about 11.4% wt. for these operating conditions. The final liquid product is only 17.6% wt.

TABLE 2

| Analysis | Unit | Result |
|---|---|---|
| Carbon (C) | % wt.. | 41.9 |
| Hydrogen (H) | % wt.. | 7.1 |
| Nitrogen (N) | % wt.. | 0.23 |
| Oxygen (0) by difference | % wt.. | |
| Water (Karl Fischer Method) | % wt.. | 26.5 |
| Acidity | mgKOH/g | 57.1 |
| Solids | % wt.. | 0.02 |
| Ph | | 2.6 |
| Micro Carbon Residue | % wt.. | 16.2 |
| Ash | % wt.. | <0.1 |
| Carbonyl content | mg BuO/g | 202 |
| lower heating value (LHV) | MJ/kg | 15.0 |
| Density 20/4° C. | | 1.19 |
| Viscosity 60° C. | cSt | 15 |

TABLE 3

| Test | 263-048 |
|---|---|
| Reaction Temperature, ° C. | 540 |
| Load Temperature, ° C. | 50 |
| Normalized yield, % wt.. | |
| Coke | 11.4 |
| Fuel Gas (H$_2$, C1-C2) | 1.2 |

TABLE 3-continued

| Test | 263-048 |
|---|---|
| Ethane | 0.4 |
| CO | 7.9 |
| CO$_2$ | 2.2 |
| LPG (C3 and C4) | 1.0 |
| Propylene | 0.6 |
| Liquid products | 17.6 |
| Water | 58.7 |
| Total | 100.0 |

EXAMPLE 5

A hydrocarbon stream rich in hydrocarbons with 6 carbon atoms, a hydrogen donor, was injected into a catalyst reactor with a flow rate of 100 kg/h. The reaction temperature was maintained at 500° C. The hydrocarbon stream characteristics are shown in Table 4. In the test A commercial equilibrium FCC catalyst containing ZSM-5 was used was used as a catalyst.

TABLE 4

| Relative area % | |
|---|---|
| n-Hexane | 35.6 |
| 3-methyl-pentane | 23.1 |
| 2-methyl-pentane | 20.2 |
| 3-methyl-trans-2-pentene, | 5.4 |
| methyl cyclopentane | 4.0 |
| 2,3-dimethyl butane | 2.9 |
| other hydrocarbons to C7 | 8.8 |
| Total | 100.0 |

The results shown in Table 5 (Test A) were obtained from the processing of this stream. There is no production of water and the amounts of carbon monoxide and carbon dioxide are negligible. The coke yield is around 0% wt. for these operating conditions. The final product is mainly composed of hydrocarbons of the gasoline range (92% wt.).

EXAMPLE 6

The hydrocarbon stream rich in n-hexane was injected with the bio-oil in three ratios in a catalytic cracking reactor 10% wt., 20% wt. and 30% wt., Tests B, C and D of Table 4, respectively.

There is production of water, carbon monoxide and carbon dioxide due to deoxygenation reactions carried out in the riser reactor and due to the hydrogen donation of the donor stream to the receiving stream. The coke yield increased as the ratio of bio-oil in the load increases. Furthermore, there is a decrease in gasoline yields, accompanied by the rising yields of LCO and decant oil.

TABLE 5

| Bio-oil % wt. | 0 | 10 | 20 | 30 |
|---|---|---|---|---|
| Normalized yields % wt. | | | | |
| Coke % wt. | 0.0 | 2.1 | 4.3 | 6.5 |
| Fuel Gas (H2, C1-C2) % wt. | 0.4 | 0.5 | 0.7 | 1.0 |
| LPG (C3-C4) % wt. | 6.7 | 2.1 | 1.5 | 1.6 |
| Gasoline (C5-220° C.) % wt. | 92.0 | 90.7 | 83.6 | 72.9 |

TABLE 5-continued

| | | | | |
|---|---|---|---|---|
| LCO (220° C.-344° C.) % wt. | 0.6 | 0.6 | 1.1 | 1.7 |
| Decant oil (+344° C.) % wt. | 0.3 | 0.3 | 0.5 | 1.0 |
| Water % wt. | 0.0 | 2.2 | 5.6 | 10.2 |
| CO % wt. | 0.0 | 1.2 | 2.1 | 4.0 |
| $CO_2$ % wt. | 0.0 | 0.3 | 0.6 | 1.1 |
| Total | 100.0 | 100.0 | 100.0 | 100.0 |

Table 6 shows the theoretical yields obtained by linear extrapolation of the actual yields of Table 4, if 100% bio-oil were processed. There is no reduction in coke yield, which remains around 21% wt. in all cases. On the other hand, the yield of gasoline is 78.7% wt. when calculated as 10% bio-oil, however decreases drastically to only 28.4% wt. when the calculation is made from 30% wt. bio-oil. That is, there is a significant drop in gasoline yield as the ratio of the donor hydrogen stream decreases. The amount of total liquid products decreased from 79.7% wt. to only 35.3% wt. for the calculation made from 30% wt. This difference is caused by the transfer of hydrogen of the hydrocarbon donor stream C6 to the acceptor stream poor in hydrogen, bio-oil, indicating the importance of the donor stream and the effectiveness of the invention.

TABLE 6

| | TEST B | TEST C | TEST D |
|---|---|---|---|
| Bio-oil % wt. | 10 | 20 | 30 |
| Normalized yields % wt. | | | |
| Coke % wt. | 21.3 | 21.4 | 21.8 |
| Fuel Gas (H2, C1-C2) % wt. | 1.6 | 1.9 | 2.6 |
| LPG (C3-C4) % wt. | −39.4 | −19.1 | −10.3 |
| Gasoline (C5-220° C.) % wt. | 78.7 | 50.1 | 28.4 |
| LCO (220° C.-344° C.) % wt. | 0.7 | 2.8 | 4.3 |
| Decant oil (+344° C.) % wt. | 0.3 | 1.4 | 2.7 |
| Water % wt. | 22.5 | 28.2 | 33.7 |
| CO % wt. | 11.8 | 10.6 | 13.4 |
| $CO_2$ % wt. | 2.5 | 2.7 | 3.4 |
| Total | 100.0 | 100.0 | 100.0 |

The invention claimed is:

1. A process to obtain fuels from biomass via fluid catalytic cracking (FCC), comprising:
   introducing a gas stream comprising saturated hydrocarbons (1), a lignocellulosic liquid stream (2), and a catalyst (3) into a first reaction section (4) of a FCC reactor;
   contacting the gas stream (1), the lignocellulosic liquid stream (2) and the catalyst (3) in the first reaction section (4) under first reaction conditions, which comprise a temperature in a range of from 500 to 800° C., to produce a reaction medium (5); and
   contacting the reaction medium (5) with a main stream comprising a traditional fossil load (6) in a second reaction section (7) of the FCC reactor under second reaction conditions to produce reaction products (8).

2. The process according to claim 1, characterized by separating the reaction products (8) obtained in the second reaction section (7) and subjecting the reaction products (8) to a hydrotreatment step to obtain high octane fuel.

3. The process according to claim 2, characterized by the hydrotreatment step employing a temperature between 350° C. and 390° C. and, as a catalyst, a metal oxide totally or partially converted into sulfides (active phase) and supported on y-alumina (y-$Al_2O_3$).

4. The process according to claim 1, characterized by the first reaction conditions comprising a temperature in a range of from 500° C. to 700° C., a pressure in a range of from 200 kPa to 400 kPa, a catalyst/biomass ratio in a range of from 10 to 40, and a contact time in a range of from 0.1 to 0.9 seconds.

5. The process according to claim 1, characterized by the second reaction conditions comprising a speed space in a range of from 200 h−1 to 400 h−1, a contact time in a range of from 1.5 to 3.0 seconds, a temperature in a range of from 500° C. and 620° C. and a catalyst/hydrocarbons ratio in a range of from 5 to 20.

6. The process according to claim 1, characterized in that the lignocellulosic liquid stream (2) is derived from the pulp and paper industry.

7. The process according to claim 1, characterized in that the lignocellulosic liquid stream (2) is obtained by fast pyrolysis processing units.

8. The process according to claim 1, characterized in that the biomass corresponds to 0.1 to 10% by weight relative to a total amount of load added to the FCC reactor.

9. The process according to claim 1, characterized by the traditional fossil load (6) being a petroleum refinery stream having a hydrogen content of at least 10% by weight based on a total weight of the traditional fossil load (6).

10. The process according to claim 1, characterized in that the gas stream (1) comprises one or more saturated hydrocarbons selected from the group consisting of propane, butane, ethane, pentane and hexane.

11. The process according to claim 10, characterized in that the stream (1) corresponds to 0.1 to 10% by weight relative to the total amount load added to the FCC reactor.

12. The process according to claim 1, characterized in that the catalyst (3) is a solid acid catalyst.

13. The process according to claim 12, characterized in that the solid acid catalyst is a zeolitic catalyst.

14. The process according to claim 1, wherein the lignocellulosic liquid stream (2) is obtained from a Kraft process.

15. The process according to claim 1, characterized by the traditional fossil load (6) having a hydrogen content of at least 10% by weight based on a total weight of the traditional fossil load (6).

16. The process according to claim 1, characterized by the first reaction section (4) of the FCC reactor being located at a base of a riser.

17. A process to obtain fuels from biomass via fluid catalytic cracking (FCC), comprising:
   introducing a gas stream comprising saturated hydrocarbons (1), a lignocellulosic liquid stream (2), and a catalyst (3) into a first reaction section (4) of a FCC reactor;
   contacting the gas stream (1), the lignocellulosic liquid stream (2) and the catalyst (3) in the first reaction section (4) under first reaction conditions, which comprise a temperature in a range of from 500 to 800° C., to produce a reaction medium (5);
   contacting the reaction medium (5) with a main stream comprising a traditional fossil load (6) in a second reaction section (7) of the FCC reactor under second reaction conditions to produce reaction products (8); and separating the reaction products (8) obtained in the second reaction section (7) and subjecting the reaction products (8) to a hydrotreatment step to obtain gasoline with a Research Octane Number (RON) above 90.

* * * * *